United States Patent Office 3,489,754
Patented Jan. 13, 1970

3,489,754
MANUFACTURE OF 2-(MORPHOLINODITHIO)-BENZOTHIAZOLE
John Joseph D'Amico, Dunbar, W. Va., assignor to Monsanto Company, St. Louis, Mo., a corporation of Delaware
No Drawing. Filed Mar. 20, 1967, Ser. No. 624,214
Int. Cl. C07d 99/10
U.S. Cl. 260—247.1   4 Claims

ABSTRACT OF THE DISCLOSURE

Catalyzing reaction of N,N'-dithiobis(morpholine) and 2,2'-dithiobis(benzothiazole) with alkali metal hydroxide, alkali metal salt of mercaptobenzothiazole, alkali metal cyanide, alkali metal acetate, alkali metal carbonate, tri(alkali metal)phosphate, or mixtures thereof to form 2-(morpholinodithio)benzothiazole.

BACKGROUND OF INVENTION

The invention is in the field of manufacturing amino azole disulfides valuable for accelerating the vulcanization of rubber.

It is now known that heating N,N'-dithiobis(morpholine) and 2,2'-dithiobis(benzothiazole) as described by Zerbe et al., U.S. 2,747,005, yields 2-(morpholinodithio)benzothiazole. The reaction is a general one which takes place with N,N'-dithioamines and 2,2'-dithiobis(thiazoles). For example, 2,2'-dithiobis(benzothiazole) and N,N'-dithiobis(pyrrolidine) react rapidly to form 2-(N-pyrrolidinyldithio)benzothiazole in high yields. On the other hand, 2-(morpholinodithio)benzothiazole, which has special properties for the vulcanization of rubber, forms more slowly from N,N'-dithiobis(morpholine) and 2,2'-dithiobis(benzothiazole), and the reaction is difficult to complete. Although the reaction is catalyzed by amines (Hardman, U.S. 3,086,018), substantial amounts are needed to achieve reasonable acceleration of the reaction, and reaction is still slower than desired.

SUMMARY

It has now been found that the alkali metal hydroxides, alkali metal salts of mercaptobenzothiazole, alkali metal cyanides, alkali metal acetates, alkli metal carbonates, and tri(alkali metal)phosphate or mixtures thereof are superior catalysts for condensing N,N'-dithiobis(morpholine) and 2,2'-dithiobis(benzothiazole) to 2-(morpholinodithio)benzothiazole. The reaction is usually effected in solvent medium, preferably an organic solvent, of which the lower monohydric alcohols or benzene are especially suitable.

DESCRIPTION OF PREFERRED EMBODIMENTS

A stirred slurry containing 33.9 grams (0.1 mole) of 2,2'-dithiobis(benzothiazole), 23.7 grams (0.1 mole) of N,N'-dithiobis(morpholine), 0.01 mole of catalyst, and 400 ml. of isopropyl alcohol was heated at refluxing temperature for 5 hours. The hot reaction mixture was filtered to remove any insoluble 2,2'-dithiobis(benzothiazole). The stirred filtrate was maintained at 0°–10° C. for an hour, the precipitate collected by filtration, and air-dried at 25°–30° C. The results are summarized below:

| Catalyst: | Percent yield of 2-(N-morpholinodithio)benzothiazole |
|---|---|
| None | 40.4 |
| Sodium mercaptobenzothiazole | 93.2 |
| Sodium hydroxide [1] | 93.2 |
| Potassium cyanide | 90.5 |
| Morpholine | 81.0 |

[1] 1.6 grams of 25% aqueous solution.

It will be noted that in the same reaction time, sodium hydroxide increased the yield more than 10% above that obtained using morpholine as a catalyst. With sodium hydroxide the same 93.2% yield was obtained after a two-hour heating period.

Although methyl alcohol is a poor solvent for the product, the reaction takes place therein. A stirred mixture containing 33.9 grams (0.1 mole) of 2,2'-dithiobis(benzothiazole), 23.7 grams (0.1 mole) of N,N'-dithiobis(morpholine), 1.6 grams of 25% aqueous sodium hydroxide, and 400 ml. of methyl alcohol was heated at 65°–66° C. (reflux for 5 hours. No solution formed, and the stirred slurry was cooled and maintained at 0°–5° C. for one hour. The solids were collected by filtration and air-dried at 25°–30° C. The product, 2-(N-morpholinodithio)benzothiazole, M.P. 128°–130° C., was obtained in 93.2% yield. After recrystallization from ethyl alcohol, it melted at 135°–136° C. Analysis gave 9.59% nitrogen and 33.80% sulfur as compared to 9.85% nitrogen and 33.82% sulfur calculated for $C_{11}H_{12}N_2OS_3$.

Excellent results were obtained in benzene. A stirred mixture containing 33.9 grams of 2,2'-dithiobis(benzothiazole), 23.7 grams of N,N'-dithiobis(morpholine), 1.6 grams (0.01 mole) of 25% aqueous sodium hydroxide, and 400 ml. of benzene was heated at 78° C. (reflux) for 5 hours. After heating one hour, most of the solids were in solution. The hot reaction mixture was filtered to remove a small amount of insoluble material. The solid separated was air-dried at 50° C. and identified as sodium salt of mercaptobenzothiazole (2 grams). The benzene was removed from the filtrate in vacuo at a maximum temperature of 80° C., at 1–2 mm. pressure. The 2-(morpholinodithio)benzothiazole after drying in air at 50° C. was obtained in 96.7% yield, M.P. 135°–136° C. After recrystallization from ethyl alcohol, the melting point remained unchanged. Analysis gave 9.72% nitrogen and 33.80% sulfur.

As illustrative of reaction in ethyl alcohol, another preferred solvent, a stirred mixture containing 33.9 grams of 2,2'-dithiobis(benzothiazole), 1.6 grams of 25% aqueous sodium hydroxide, 23.7 grams of N,N'-dithiobis(morpholine), and 400 ml. of ethyl alcohol was heated at 78°–79° C. (reflux) for 0.5 hour. Complete solution resulted after 15 minutes at refluxing temperature. The hot reaction mixture was filtered, but no insoluble matter was recovered. The filtrate was cooled and stirred at 0°–5° C. for one hour, the precipitate was collected by filtration, and air-dried at 25°–30° C. The ethyl alcohol was removed from the filtrate in vacuo and the solid residue washed with water and air-dried at 25°–30° C. to obtain two additional grams of product, M.P. 126°–128° C. The total yield was 96.7%. After recrystallization from ethyl alcohol, the product melted at 135°–136° C. and contained 9.71% nitrogen and 33.33% sulfur.

A stirred mixture containing 33.9 grams of 2,2'-dithiobis(benzothiazole), 27.3 grams of N,N'-dithiobis(morpholine), 0.01 mole of catalyst, and 400 ml. of ethyl alcohol was heated at 78°–79° C. (reflux) for the time specified below. The hot reaction mixture was filtered to remove any unreacted 2,2'-dithiobis(benzothiazole). The stirred filtrate was held at 0°–5° C. for one hour, the resulting solid collected by filtration, and air-dried at 25°–30° C.

| Catalyst | Heating time, hours | Percent yield of 2-(N-morpholinodithio)-benzothiazole |
|---|---|---|
| Sodium acetate | 5.0 | 93.2 |
| Potassium carbonate | 1.5 | 93.2 |
| Trisodium phosphate | 5.0 | 94.9 |

What is claimed is:

1. In the method of preparing 2-(morpholinodithio)benzothiazole by reacting N,N'-dithiobis(morpholine) and 2,2'-dithiobis(benzothiazole) in the presence of a catalyst, the improvement which comprises employing as catalyst a member selected from the group consisting of alkali metal hydroxide, alkali metal salt of mercaptobenzothiazole, alkali metl cyanide, alkali metal acetate, alkali metal carbonate, tri(alkali metal)phosphate, and mixtures thereof.

2. The process of claim 1 wherein the catalyst is sodium hydroxide, and the reaction is effected in lower monohydric alcohol.

3. The process of claim 1 wherein the catalyst is sodium hydroxide, and the reaction is effected in benzene.

4. The process of claim 1 wherein the catalyst is potassium carbonate, and the reaction is effected in ethyl alcohol.

References Cited

UNITED STATES PATENTS

| | | | |
|---|---|---|---|
| 2,850,496 | 9/1958 | Hardman | 260—247.1 |
| 3,070,599 | 12/1962 | Hendry et al. | 260—247.1 |
| 3,100,773 | 9/1963 | Louth et al. | 260—247.1 |

ALEX MAZEL, Primary Examiner

JAMES H. TURNIPSEED, Assistant Examiner